United States Patent [19]
Fauck et al.

[11] 4,441,763
[45] Apr. 10, 1984

[54] VARIABLE LOAD CONTROLLED FLUID BRAKE PRESSURE REGULATOR

[75] Inventors: Gerhard Fauck, Hanover; Bernd-Joachim Kiel, Wunstorf, both of Fed. Rep. of Germany

[73] Assignee: WABCO Fahrzeugbremsen GmbH, Hanover, Fed. Rep. of Germany

[21] Appl. No.: 349,936

[22] Filed: Feb. 18, 1982

[30] Foreign Application Priority Data

Feb. 18, 1981 [DE] Fed. Rep. of Germany ....... 3105874

[51] Int. Cl.$^3$ ............................................... B60T 8/20
[52] U.S. Cl. ................................. 303/23 R; 303/22 A
[58] Field of Search ............ 188/195; 303/6 C, 22 A, 303/22 R, 23 A, 23 R

[56] References Cited

U.S. PATENT DOCUMENTS

| | | | |
|---|---|---|---|
| 3,692,365 | 9/1972 | Demarez et al. | 303/22 R X |
| 3,767,274 | 10/1973 | Gruner et al. | 303/22 R |
| 4,299,427 | 11/1981 | Fauck | 303/22 A |

Primary Examiner—Duane A. Reger
Attorney, Agent, or Firm—G. J. Falce

[57] ABSTRACT

A vehicle load controlled fluid brake pressure regulator having a relay valve portion that includes a variable area differential relay valve piston, the effective area of which varies in accordance with different load conditions. A control portion of the brake pressure regulator includes a stepped control piston having two piston faces subject to the load dependent pressure of separate air springs of the vehicle, so as to be axially displaceable for different load conditions. Oppositely inclined control surfaces of two cam members carried by the control piston translate the axial position of the control piston to the relay valve piston via an actuator stem. One cam member is axially adjustable relative to the other, so as to cause the hollow or low point of the cam profile formed by the inclined control surfaces to engage the actuator stem for any desired "empty" load setting of the relay valve portion.

6 Claims, 1 Drawing Figure

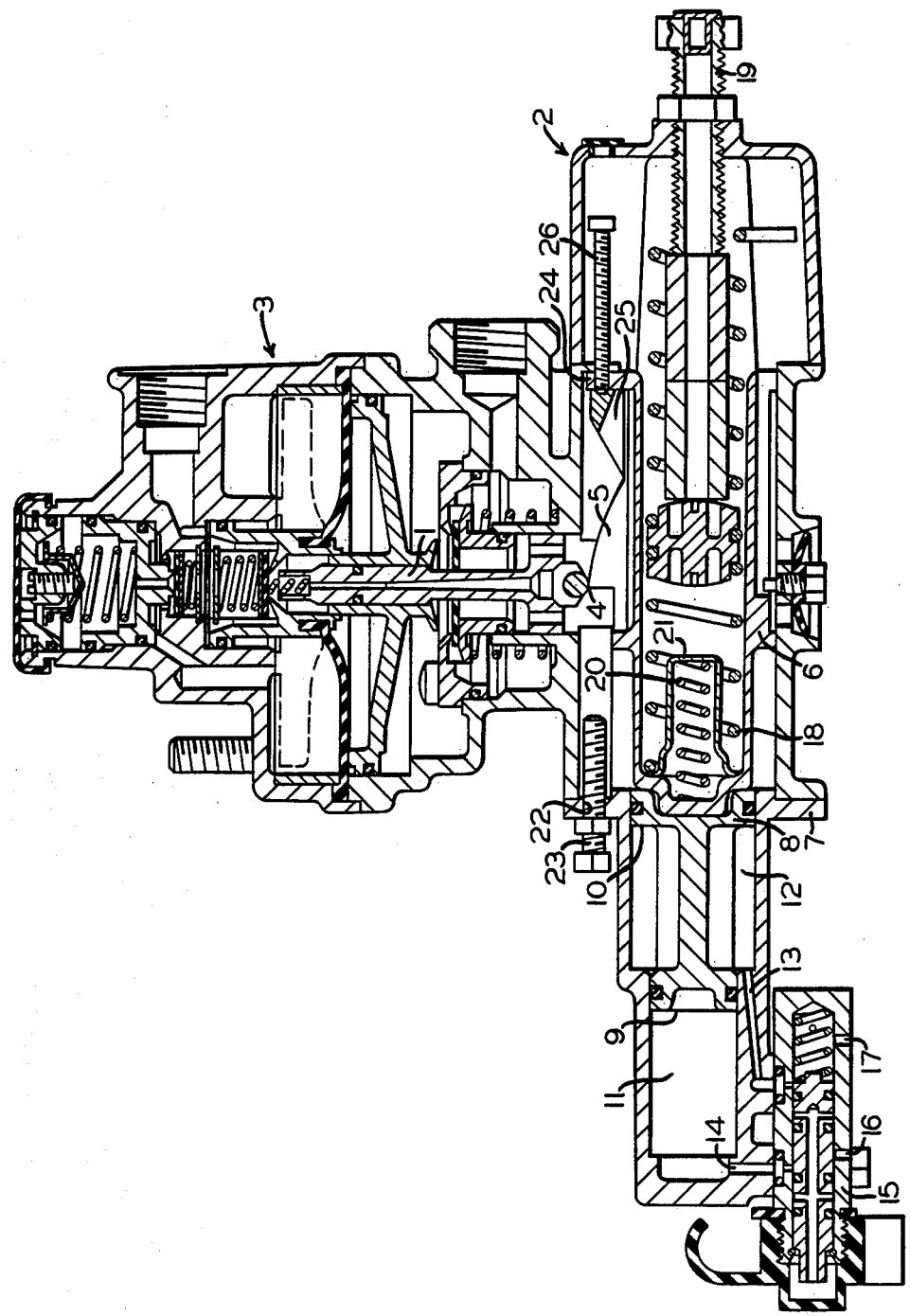

VARIABLE LOAD CONTROLLED FLUID BRAKE PRESSURE REGULATOR

BACKGROUND OF THE INVENTION

The present invention relates to variable load controlled fluid pressure regulator valves for establishing vehicle braking levels in accordance with different load conditions, and particularly to such regulator valves which comprise a load control piston subject to the pressure of two independent air springs of the vehicle, so that in the event the pressure of one air spring is lost, due for example to a ruptured bellows or broken pipe, the stroke of the control piston is reduced by one half.

For safety purposes, it is common practice to utilize two separate air springs of the vehicles, by forming the load control piston with different pressure faces on which the pressure of the respective air springs acts in opposition to a governing spring. A first cam surface of the load control piston actuates the regulator relay valve through a diaphragm type piston, the effective area of which may be varied in accordance with the vehicle load condition, in order to modulate the vehicle braking accordingly. An actuating stem of the diaphragm piston rides on the inclined control surface of the first cam member, so as to increase or decrease the diaphragm piston area, as the air spring pressure on the load control piston changes with the vehicle load condition between "full" load and "empty" load. A second cam member of the load control piston is provided with a surface that is inclined in the opposite direction to the inclined surface of the first cam member so as to adjust the effective diaphragm piston area, in the event there is a loss of air in at least one air spring, due to a rupture of the air spring bellows, for example.

Variable load brake regulator valves of the foregoing type are designed for a given set of conditions, wherein the actuator stem of the relay valve sets the variable area diaphragm piston for a predetermined "empty" load brake condition, when the load control piston is positioned so that the low point of the cam profile formed between the inclined control surfaces of the first and second cam members are engageable with the relay valve actuator stem. In the event one air spring ruptures, the load control force on the control piston is reduced by one half, thus changing the normal load dependent position of the control piston. If such a malfunction occurs when the vehicle is "empty", for example, the movement of the control piston places the second cam member in engagement with the actuator stem, thus preventing the braking pressure from being reduced below the "empty" load braking pressure.

Where the vehicle operating requirements are such that the "empty" load setting of the relay valve does not occur at the low point of the cam profile, the governing spring is adjusted to axially shift the control piston to cause the actuator stem to ride part way up the inclined control surface of the first cam member until the desired load setting is achieved. This results in a dangerous situation, since it is now conceivable that in the event an air spring ruptures under certain load conditions, the resultant movement of the load control piston will allow the actuator stem to ride down the incline of the first cam member, without engaging the incline of the second cam member. It is possible, therefore, that the resultant position of the actuator stem on the inclined surface of the first cam member will be in a lower position than in the "empty" load setting and will accordingly produce a lower braking force than the "empty" load braking force.

SUMMARY OF THE INVENTION

The object of the invention is to arrange a brake regulator valve device of the aforementioned type, so as to provide at least an empty condition braking pressure, in the event a ruptured bellows causes the air spring pressure to be depleted or reduced below a value corresponding to the empty load condition of the vehicle.

This objective is accomplished in the present invention by the regulating valve device with first and second cam members having oppositely inclined control surfaces, at least one of which is adjustable axially relative to the other in order to vary the low point of the cam profile formed by the intersection of the respective inclined surfaces. This low point is adjusted to correspond to the desired empty setting of the regulating valve relay portion. A stepped load control piston is subject to air spring pressure from two air bellows, and acts in opposition to a control spring to position the first and second cams in accordance with the vehicle load condition. The relay valve follower rides on the inclined surface of the first cam member so long as at least empty level air spring pressure is available at both air bellows. In the event an air bellows ruptures, however, the loss or reduction of air spring pressure effective at the load control piston allows the control spring to displace the load control piston axially in a direction to cause the relay valve follower to ride on the inclined surface of the second cam member, thus insuring a certain brake force at least as great as would otherwise be attained on a vehicle in an "empty" load condition.

BRIEF DESCRIPTION OF THE DRAWING

The foregoing objective and other advantages of the invention will be apparent from the following more detailed explanation when taken with the single FIGURE drawing showing an elevation section view of a variable load brake regulator incorporating the instant invention.

DESCRIPTION AND OPERATION

An actuator stem 1, which makes a load-dependent adjustable connection between a control portion 2 and a braking relay portion 3 of the brake pressure regulator, is engageable at its lower end 4 with the inclined surface of a main cam member 5, which is part of a hollow load control piston 6.

A housing 7 is connected to the control portion housing in such a way that a stepped control piston 8 guided coaxially in the housing 7 is in operative connection with the load control piston 6.

Once end surface 9 of the stepped piston 8 cooperates with housing 7 to define a first control chamber 11, while another end surface of stepped piston 8 cooperates with housing 7 and the one end surface 9 to form a second control chamber 12. In the example shown, there is a so-called test device 15 having port connections 16 and 17 by way of which the vehicle air spring pressure is connected to passageways 13 and 14 leading to chambers 11 and 12.

A governing spring 18 is located in the cavity of control piston 6, in such a way that its tension acts counter to the direction of the air spring pressure acting on stepped piston 8, and is transmitted to the load control piston 6. This spring can be adjusted by means of a screw 19. A second additional spring 20 is located inside governing spring 18 in such a way that this second spring 20 acts in series with governing spring 18 by means of a cup-shaped intermediate piece 21. Fastened to control piston 6 is an angular rail 24, on which an emergency cam member 25 is arranged, so as to be axially-displaceable relative to control piston 6. By means of a threaded pin 26 located in a threaded hole in the angular rail portion 24, and operatively connected to the emergency cam member 25, the emergency cam member 25 can be moved toward or away from the main cam member 5.

Like main cam member 5, emergency cam member 25 is also designed with a surface running at an inclined angle with the axis of control piston 6, but in the opposite direction. Parallel to the axis of control piston 6 is a threaded hole 22 formed in the wall of the brake force regulator housing, in which is contained a threaded pin designed as an adjustable stop 23.

The braking force regulator is fastened to the vehicle frame and connected by pressure lines to the air spring bellows attached to the axles. In the "empty" load condition of the vehicle, the air spring pressure exerts a minimum force on control piston 6 via stepped piston 8, in opposition to governing spring 18. Control piston 6 is thus moved in a leftward direction from the extreme right-hand position shown. This axial displacement of piston 6 can vary with different design parameters, such as the "empty" load condition air spring pressure, thus varying the axial position of cam members 5 and 25. Also, the vertical disposition of actuator stem 1 can vary in accordance with the "empty" setting of relay valve portion 3, as determined by the desired "empty" vehicle braking pressure. Accordingly, the "empty" load position of actuator stem 1 may not correspond to the lowest point on the inclined surface of cam member 5, but may, for example, engage cam member 5 at approximately the lower third of its inclined surface. It will be apparent that any decrease in the load control pressure acting on stepped piston 8, and thus control piston 6, as by a ruptured air spring bellows or broken air line, will result in spring 18 moving piston 6 in a leftward direction. This allows actuator stem 1 to ride down the inclined surface of cam member 5, which is carried in a leftward direction with control piston 6. Accordingly, a setting of the relay valve portion 3 would arise in which braking pressure would be less than that attained at the desired "empty" load setting for which the relay valve was originally set. Such degradation of the braking pressure under abnormal conditions resulting in decreased load control pressure is prevented from occurring with the present invention, however, as follows.

By means of threaded pin 26, emergency cam member 25 may be shifted leftward relative to cam member 5, so that the vertical point at which their inclined surfaces intersect is raised to a level corresponding to the vertical position of the lower end 4 of actuator stem 1. In this way, the cam profile can be adjusted so that its lowest point always coincides with the vertical position of actuator stem 1, at the desired "empty" load setting of relay valve portion 3. Accordingly, any reduction of load control pressure due to a ruptured air spring or the like, as previously discussed, will now cause actuator stem 1 to ride up the inclined surface of emergency cam member 25, as spring 18 moves piston 6 in a leftward direction. In this way, the level of load controlled braking pressure will be assured of being at least equal to the "empty" load braking pressure. For example, since the load control pressure is derived from the air spring pressure of two separate bellows, loss of pressure due to one of the bellows rupturing, results in the distance control piston 6 is moved by spring 18 corresponding to one half the full piston stroke. Thus, if the vehicle load is between "full" and "half" load condition at the time air spring pressure of one bellows is lost, the lower part 4 of actuator stem 1 will remain engageable with the inclined surface of cam member 5 and will cause the regulator relay valve portion 3 to produce a level of braking between a "half" load and "empty" load brake pressure. If the vehicle load is between "half" load and "empty" load, the lower part 4 of actuator stem 1 is shifted to the inclined surface of emergency cam member 25, due to the aforementioned one-half stroke movement of control piston 6, thereby obtaining a braking pressure that corresponds to a value between "empty" and "half" load braking. Consequently, at least an "empty" load condition braking pressure is assured under all load conditions, in the event of a malfunction effecting a loss of one air spring pressure.

By means of stop 23, the travel of emergency cam member 25 can be set. This is done by having the threaded pin, which serves as a stop 23, screwed into or out of the housing wall of the braking force regulator housing, which limits the travel of the support element connected with control piston 6, and the two cam members 5 and 25. In this manner, emergency cam member 25 can be set at any desired position between "empty" and "full" load, without changing the setting of main cam member 5.

Having now described the invention, what we claim as new and desire to secure by Letters Patent, is:

1. A vehicle load controlled fluid brake pressure regulator comprising:
   (a) load-dependent variable relay valve means for controlling the vehicle brake pressure;
   (b) a control piston subject to a control pressure that varies in accordance with the vehicle load;
   (c) a control spring acting on said control piston in a direction counter to said control pressure, thereby establishing an axial position of said control piston in accordance with the vehicle load condition;
   (d) first and second cam members carried on said piston means for axial movement therewith, said first and second cam members each having an inclined control surface forming a cam profile that varies in a direction perpendicular to the axis of said control piston, said inclined control surfaces running in opposite directions;
   (e) actuator means engageable with the control surface of said cam members and with said relay valve means for setting said relay valve means in accordance with the axial position of said control piston; and
   (f) means for axially adjusting one of said cam members relative to the other to thereby set the low point of said cam profile in accordance with the desired "empty" load braking pressure setting of said relay valve means.

2. A vehicle load controlled fluid brake pressure regulator as recited in claim 1, further comprising stop means for limiting the axial travel of said one cam member.

3. A vehicle load controlled fluid brake pressure regulator as recited in claim 2, wherein said stop means comprises a threaded pin in the wall of said brake pressure regulator housing, said threaded pin being disposed parallel to the axis of said control piston.

4. A vehicle load controlled fluid brake pressure regulator as recited in claim 1, further characterized in that said adjusting means comprises:
(a) an angular extension of said control piston; and
(b) a threaded pin carried in said angular extension so as to be parallel with the axis of said control piston, said threaded pin being connected to said one of said cam members to effect said axial adjustment thereof.

5. A vehicle load controlled fluid brake pressure regulator as recited in claim 1, further characterized in that:

(a) said control piston is provided with two faces, each subject to said control pressure of a different air spring device of said vehicle; and
(b) said one of said cam members having the control surface thereof engageable with said actuator means only when said control pressure at said one face of said control piston is lost to guarantee that the resultant setting of said relay valve means does not become less than said "empty" setting thereof.

6. A vehicle load controlled fluid brake pressure regulator as recited in claim 5, further characterized in that the stroke of said control piston is reduced by one half when said control pressure of one of said air spring devices is lost.

* * * * *